United States Patent
Matsuda

(10) Patent No.: US 7,708,922 B2
(45) Date of Patent: May 4, 2010

(54) METHOD FOR MOLDING SYNTHETIC RESIN STRUCTURE

(75) Inventor: Takehiro Matsuda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1366 days.

(21) Appl. No.: 10/906,332

(22) Filed: Feb. 15, 2005

(65) Prior Publication Data

US 2005/0179168 A1    Aug. 18, 2005

(30) Foreign Application Priority Data

Feb. 18, 2004   (JP) .............................. 2004-041752

(51) Int. Cl.
*B29C 45/14*   (2006.01)
*B29C 70/72*   (2006.01)

(52) U.S. Cl. ..................... 264/251; 264/275; 264/297.2

(58) Field of Classification Search ........................ None
See application file for complete search history.

(56) References Cited

U.S. PATENT DOCUMENTS 5,999,501 A * 12/1999 Tomita et al. ............ 369/44.15

2006/0187579 A1 * 8/2006 Xu et al. .................. 360/97.02

FOREIGN PATENT DOCUMENTS

| JP | 2001-88173 | 4/2001 |
|----|------------|--------|
| JP | 2001-229555 | 8/2001 |
| JP | 2001-315158 | 11/2001 |
| JP | 2003-112349 | 4/2003 |

OTHER PUBLICATIONS

Office Action issued for corresponding Japanese Patent application No. 2004-041752 on Aug. 12, 2008—Notification of Reason(s) for Rejection.

* cited by examiner

*Primary Examiner*—Edmund H. Lee
(74) *Attorney, Agent, or Firm*—Kratz, Quintos & Hanson, LLP

(57) ABSTRACT

At the time of insert molding of suspension bases (500), areas of junction parts of the suspension bases (500) and flat plates (560) which are directly affected by fluidized synthetic resin when the synthetic resin is injected are varied independently so as to correct strain of suspensions (550).

8 Claims, 17 Drawing Sheets

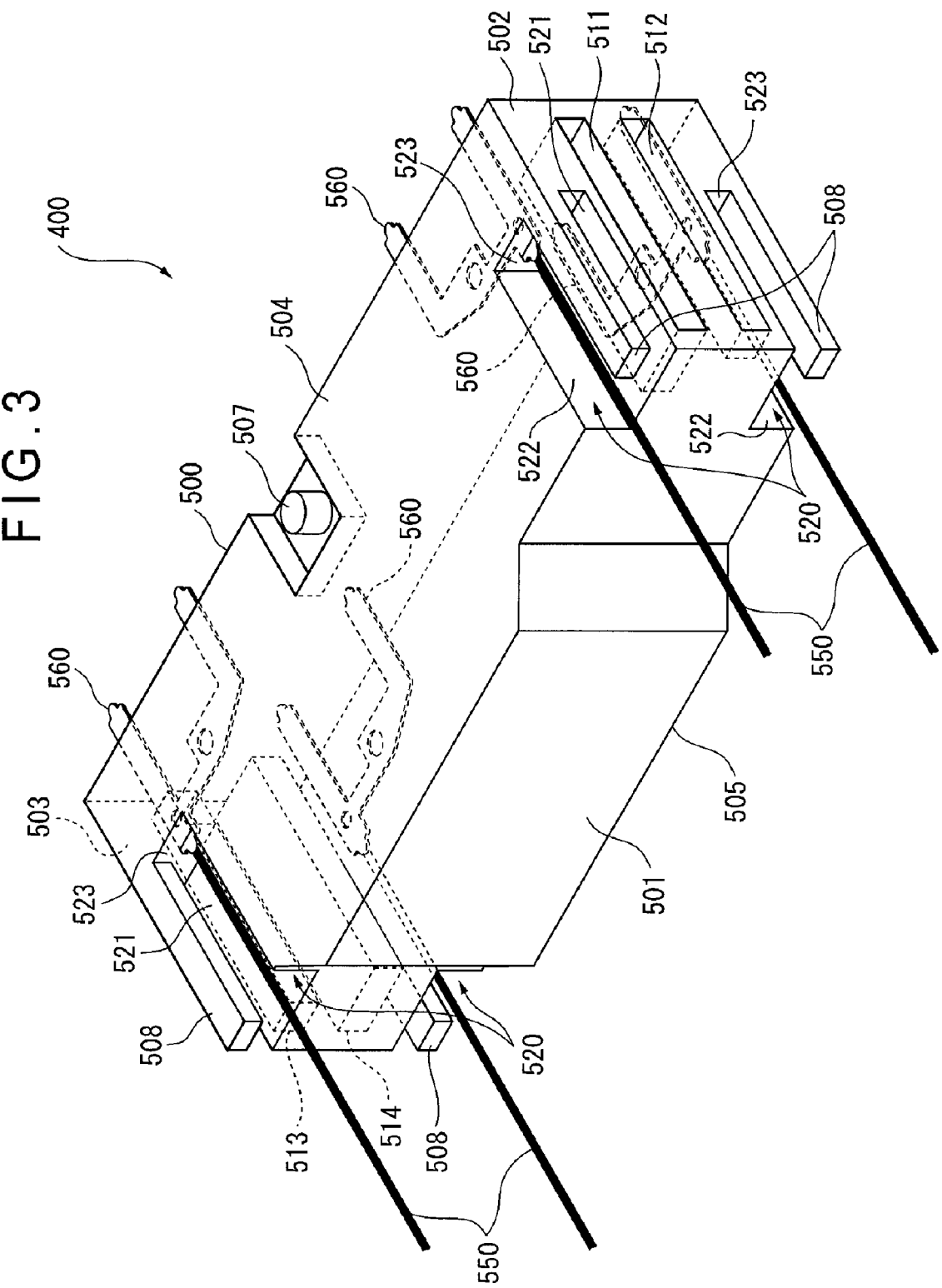

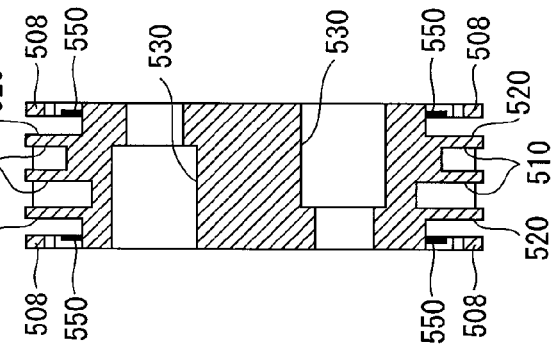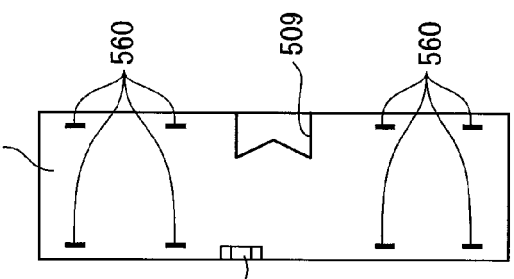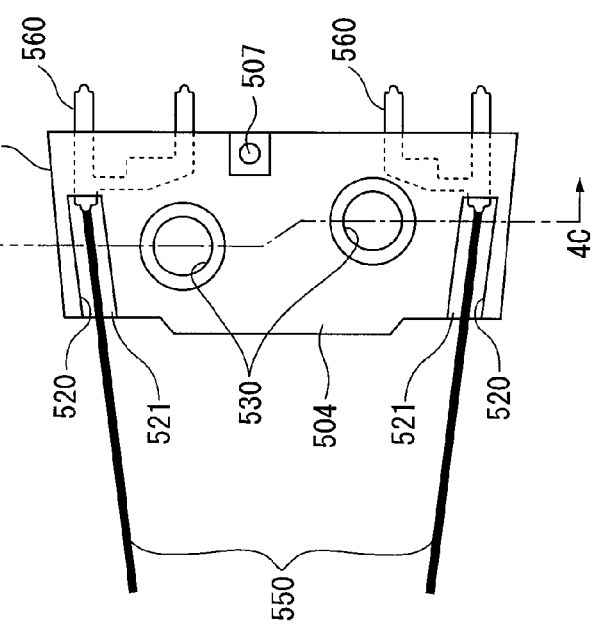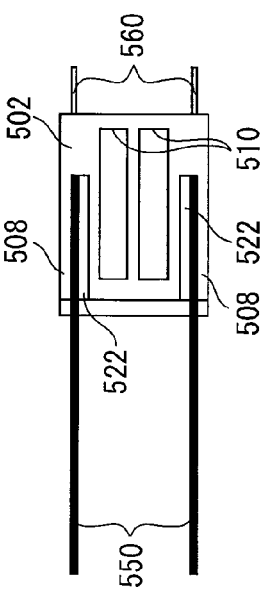

METHOD FOR MOLDING SYNTHETIC RESIN STRUCTURE

BACKGROUND OF THE INVENTION

1. Field of the Invention

The present invention relates to a method for molding a synthetic resin structure, a method for molding a pick-up actuator employing the method for molding a synthetic resin structure, a synthetic resin structure molded by the method for molding a synthetic resin structure, and a pick-up actuator molded by the method for molding a pick-up actuator.

2. Description of Related Art

Conventionally, a pick-up actuator is used as a mechanism to record and/or reproduce data to and/or from an optical recording medium. There are a wide variety of pick-up actuators. Recently, among those pick-up actuators, researches are being made into pick-up actuators that can record and/or reproduce data to and/or from an optical recording medium with a higher speed. As an example of such pick-up actuators, there is known a pick-up actuator that has four or more elastic holding members and two or more movable axes (for example, refer to Japanese Patent Laid-Open Publication No. 2001-229555, FIG. 4). The pick-up actuator includes a lens holder that holds an objective lens, a plurality of drive coils, and magnets, and a suspension base that is fixed to an actuator base and swingably holds the lens holder on a plurality of axes using linear elastic members, and that has a skew mechanism that can adjust the angle of the lens holder desirably. The pick-up actuator, which can be reduced in weight and of wider bandwidth, gets a lot of attention.

The pick-up actuator is formed by insert molding, which inserts linear elastic members to a mold for a lens holder and an actuator base, and injects synthetic resin into the mold. In the insert molding, concave cut-off portions may be formed on the surface of respective parts made of synthetic resin so as to equalize thickness thereof, thereby preventing shrinkage of synthetic resin and suppressing strain of linear elastic members (refer to FIG. 18). As shown in FIG. 18, a lens holder 920 is linked to a suspension base 900 through linear elastic members 910. The suspension base 900 and the lens holder 920 are formed by insert molding, which injects synthetic resin into a mold with the linear elastic members 910 placed within the mold. In this case, concave cut-off portions 901 are formed in the suspension base 900. Generally, in injection molding of synthetic resin, in case respective parts are not equalized in thickness without forming such cut-off portions 901, there is undesirably raised shrinkage, that is, recessions are formed on the surface of the respective parts. When shrinkage is raised, pressure is applied to the inserted linear elastic members 910 due to the recessions, which makes the linear elastic members 910 be fixed with its figuration state strained. So as to prevent shrinkage, the suspension base 900 has the concave cut-off portions 901 evenly formed around the linear elastic members 910, which can equalize thickness of respective synthetic resin parts.

The pick-up actuator disclosed in the above-described document is required to have members having various functions built therein together with the lens holder and suspension base, and furthermore, it is desired that the lens holder be reduced in weight to the utmost extent. Accordingly, a pick-up actuator of this type may have its configuration made asymmetric. In this case, the gate position or injection port for injecting synthetic resin at the time of insert molding is arranged in a deviated position. Thus, at the time of injection molding, some points of the linear elastic members are strongly affected by flow of synthetic resin, while some points of the linear elastic members are weakly affected by flow of synthetic resin, depending on the distance from the gate position. As a result, points of the linear elastic members which are strongly affected by flow of synthetic resin are strained due to pressure brought about by the flow of synthetic resin, and raise angular difference as compared with points of the linear elastic members which are weakly affected by flow of synthetic resin.

Furthermore, when the cut-off portions are not formed on the surface, recessions may be formed on the suspension base due to shrinkage, which may strain the linear elastic members.

Moreover, since the cut-off portions 901 have their dimensions equalized, in case the gate position is arranged in a deviated position, forming the cut-off portions 901 on the surface as shown in FIG. 18 does not solve the above-described affection by flow of synthetic resin.

When the linear elastic members are strained, the relative angle of the lens holder and the suspension base of the pick-up actuator (angle due to rotation around the X-axis and the Y-axis shown in FIG. 18) become large, which undesirably increases skew adjustment range. Thus, height dimension of the actuator becomes large, which undesirably leads to disadvantage in providing a small-sized lightweight device.

Furthermore, when recording and/or reproducing data to and/or from an optical recording medium, the pick-up actuator follows the displacement of the optical recording medium substantially in the vertical direction (focusing direction) as well as substantially in the horizontal direction (tracking direction) along the recording surface thereof. At this time, when the linear elastic members are strained, large skews may be raised due to strokes along the focusing direction and tracking direction, which undesirably lowers recording and/or reproducing capabilities. Especially, strain of linear elastic members, which is admissible in an optical recording medium of comparatively low density and low capacity such as a conventionally known CD (Compact disc) or DVD (Digital versatile disc), cannot be ignored when using an optical recording medium of high density and high capacity such as a recently remarkable Blue-ray disc.

SUMMARY OF THE INVENTION

It is therefore an object of the present invention to overcome the above-mentioned drawbacks by providing a method for molding a small-sized lightweight synthetic resin structure of high-precision, a method for molding a pick-up actuator employing the method for molding a synthetic resin structure, a synthetic resin structure molded by the method for molding a synthetic resin structure, and a pick-up actuator.

An aspect of the present invention is to provide a method for molding a synthetic resin structure by insert molding that forms a synthetic resin structure having a first synthetic resin structure, a second synthetic resin structure, and a plurality of metal elastic holding members which link the first synthetic resin structure and the second synthetic resin structure, which injects synthetic resin into a mold for molding the first synthetic resin structure and the second synthetic resin structure from injection ports of synthetic resin formed in the mold with the elastic holding members placed in the mold; wherein in the injection of synthetic resin, strain of the elastic holding members are corrected by independently varying areas of junction parts of the synthetic resin structures and the elastic holding members which are directly pressed by fluidized synthetic resin injected from the injection ports.

Another aspect of the present invention is to provide a method for molding a pick-up actuator employing aforesaid method for molding a synthetic resin structure, in which the first synthetic resin structure is a moving structure that holds an objective lens, the second synthetic resin structure is a fixed structure that swingably holds the moving structure through the plural elastic holding members.

A further aspect of the present invention is to provide a synthetic resin structure that is molded by employing aforesaid method for molding a synthetic resin structure.

Still another aspect of the present invention is to provide a pick-up actuator that is molded by employing aforesaid method for molding a pick-up actuator.

BRIEF DESCRIPTION OF THE DRAWINGS

FIG. 3 shows a perspective view of a suspension base viewed from a lens holder side;

FIG. 4A shows a plan view of the suspension base;

FIG. 4B shows a side view of the suspension base;

FIG. 4C shows a cross-sectional view of the suspension base along 4C-4C line in FIG. 4A;

FIG. 4D shows a front view of the suspension base;

DETAILED DESCRIPTION OF PREFERRED EMBODIMENT(S)

Figure 1:
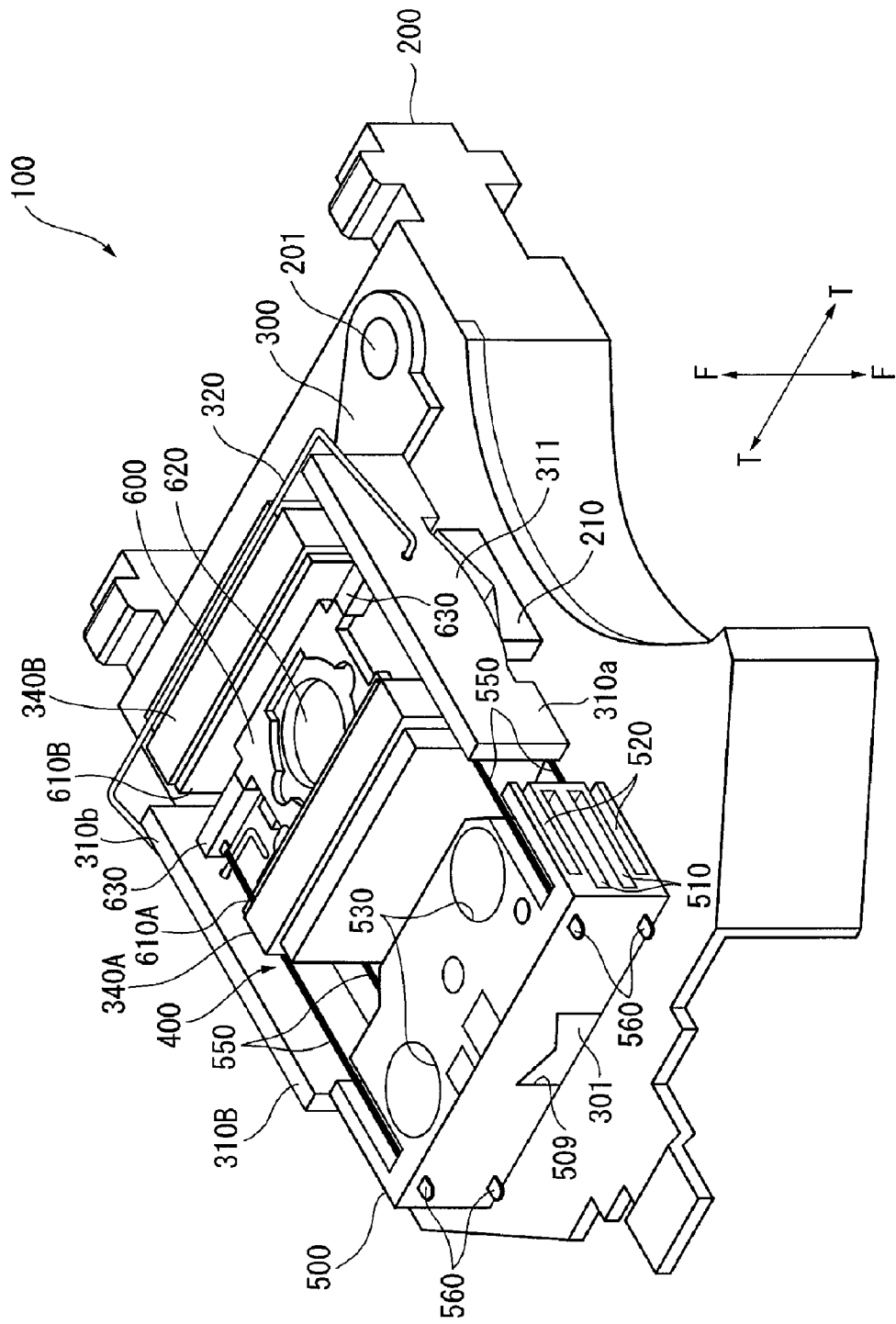
FIG. 1 shows a perspective view of an entire pick-up device of the first embodiment of the present invention.

Preferred embodiments of the present invention will further be described below with reference to the accompanying drawings. FIG. 1 shows a perspective view of an entire pick-up device of the present embodiment, while FIG. 2 shows a plan view of the entire pick-up device.

First Embodiment

Configuration of Pick-Up Device

Figure 2:
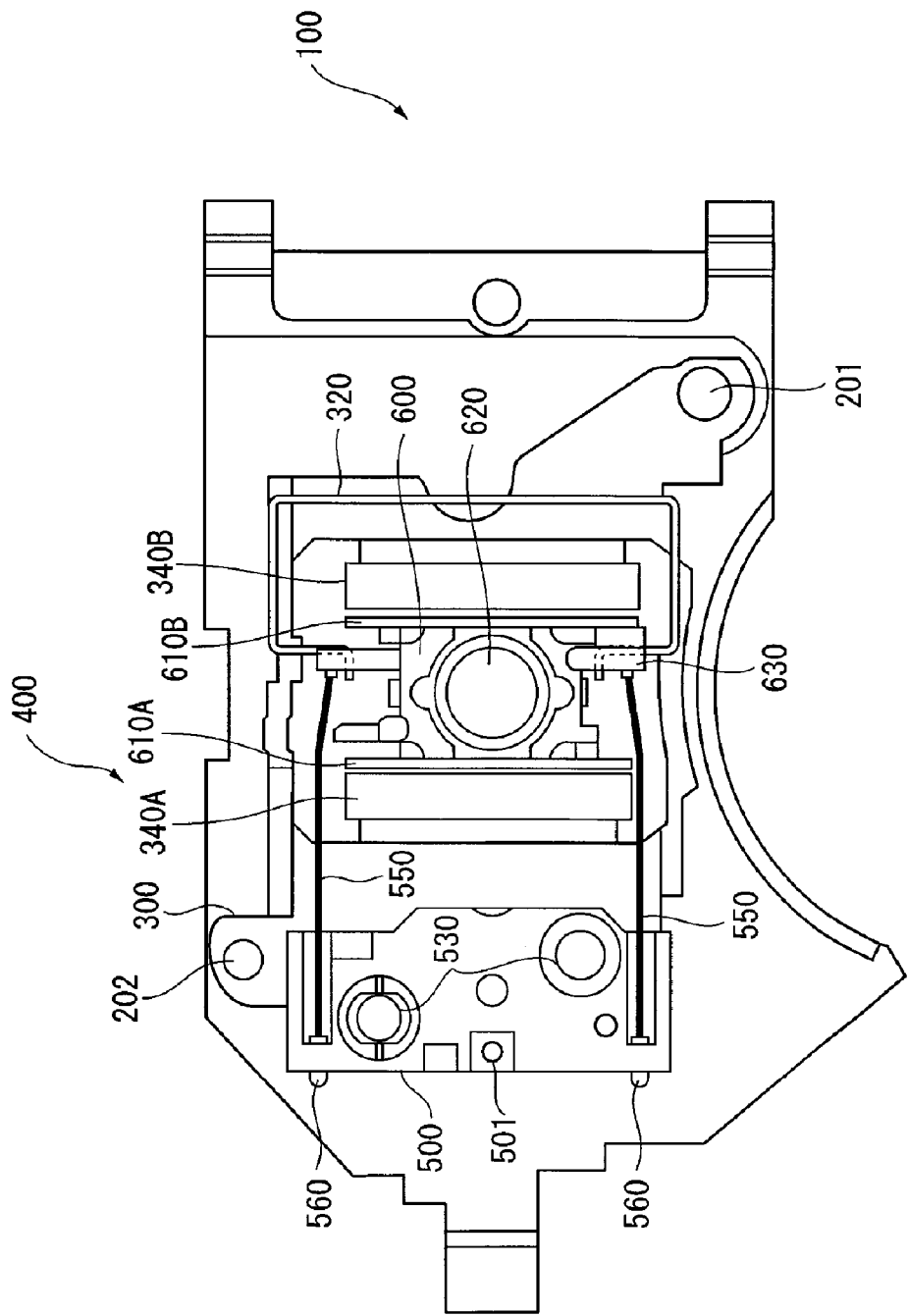
FIG. 2 shows a plan view of the entire pick-up device.

FIG. 1 and FIG. 2 show a pick-up device 100. The pick-up device 100 records and/or reproduces data to and/or from an optical recording medium or an optical disc such as a CD, DVD, or Blue-ray disc. Accordingly, the pick-up device 100 is built in a drive apparatus that records and/or reproduces data to and/or from such an optical recording medium.

The pick-up device 100 includes a pick-up body 200, an actuator base 300 that is fixed to the pick-up body 200, an actuator unit 400 that is fixed to the actuator base 300 and works as a pick-up actuator. The actuator unit 400 includes a suspension base 500 as a fixed structure, a lens holder 600 as a moving structure, and four suspensions 550 as elastic holding members that link the suspension base 500 and the lens holder 600.

The actuator base 300 has uprising members 310a, 310b which are parallel with each other, and the uprising members 310a, 310b have protrusions 311 which protrude toward the pick-up body 200. The actuator base 300 is positioned when the protrusions 311 are engaged with M-shaped holders 210 formed on the pick-up body 200. The actuator base 300 has its one end fixed to a sprung boss 201 formed on the pick-up body 200, and has its other end fixed to the pick-up body 200 by a setscrew 202.

The actuator unit 400 is positioned between the uprising members 310a, 310b when a V-shaped cutout 509 formed in the suspension base 500 is engaged with an M-shaped protrusion 301 formed on the actuator base 300. The actuator unit 400 is fixed to the actuator base 300 when the suspension base 500 is screwed to the actuator base 300.

The uprising members 310a, 310b have a stopper 320. The stopper 320 is a linear member that is so folded as to form a U shape. The leading ends of the stopper 320 have restrainers (not shown) which protrude toward the inner side of the uprising members 310a, 310b or the lens holder 600 side. The stopper 320 is fixed to the uprising members 310a, 310b with its restrainers inserted into insertion holes (not shown) formed thereat. The stopper 320 restricts the stroke (movable range) of the lens holder 600 along the focusing direction F and the tracking direction T. Thus, when malfunction occurs in focusing servo control and tracking servo control, the lens holder 600 is prevented from moving and crashing into the pick-up body 200 and other components to damage the lens holder 600 itself and other components arranged thereon.

The actuator base 300 has a laser light source (not shown) attached to the end thereof. Laser light emitted from the laser light source is directed to the lower side of an objective lens 620 to be described later through an optical path configured by an optical system arranged within the actuator base 300. A reflective mirror (not shown) is arranged on the lower side of the objective lens 620, and laser light has its direction turned-up by the reflective mirror and passes through the objective lens 620 from the lower side to the upper side thereof. An optical disc (not shown) is arranged on the upper side of the objective lens 620, and the objective lens 620 focuses laser light on the information recoding surface of the optical disc.

{Configuration of Suspension Base}

FIG. 3 shows a perspective view of the suspension base 500 viewed from the lens holder 600 side. FIG. 4A shows a plan view of the suspension base 500, FIG. 4B shows a side view of the suspension base, FIG. 4C shows a cross-sectional view of the suspension base along 4C-4C line in FIG. 4A, and FIG. 4D shows a front view of the suspension base.

As shown in these FIGS. 3 and 4A to 4D, the suspensions 550 link the suspension base 500 and the lens holder 600. It is desirable that the suspensions 550 be made of a material that is of high intensity and can endure large bending stress as spring material, and is excellent in fatigue resistance properties against repetition operations, for example, beryllium copper. The suspensions 550 may be made of other materials other than beryllium copper, such as phosphor bronze alloy that is of high intensity and excellent in fatigue resistance properties. The suspensions 550 have flat plates 560 arranged at the leading ends thereof, which are to be inserted to the suspension base 500 and the lens holder 600. The flat plates 560 are bifurcated to be formed into substantially U shapes with their leading ends protruding from the end surface of the suspension base 500 to be fixed thereto, as shown in FIG. 4A.

The suspension base 500 is formed by insert molding, which injects synthetic resin into a mold with the flat plates 560 arranged at the leading ends of the suspensions 550 placed in the mold. The suspension base 500 has a facing surface 501 that faces the lens holder 600, side surfaces 502, 503 adjoining the facing surface 501, a top surface 504 and a bottom surface 505 adjoining the facing surface 501 and the side surfaces 502, 503, and a rear surface 506 which is the opposite surface of the facing surface 501 and adjoins the side surfaces 502, 503 and the top surface 504 and the bottom surface 505.

At four corners of the suspension base 500 which are located on the facing surface 501 side, or positions where the facing surface 501, the side surface 502 or the side surface 503, the top surface 504 or the bottom surface 505 adjoin each other, there are formed concave suspension channels 520. The suspension channels 520 have suspension channel top surfaces 521 which are parallel with the top surface 504 and the bottom surface 505, suspension channel side surfaces 522 which are parallel with the side surfaces 502, 503, and suspension channel facing surfaces 523 which are parallel with the facing surface 501. The suspensions 550 are made to pass through the suspension channels 520 from the facing surface 501 side, and the flat plates 560 arranged at the leading ends of the suspensions 550 penetrate the suspension base 500 from the suspension channel facing surfaces 523 to the rear surface 506. At corners of the suspension channel facing surfaces 523 which are located on the side surface 502 or the side surface 503, there are formed protrusions 508. The protrusions 508 retain dump material (vibration-suppressing chemical material) that is filled in the suspension channels 520.

On the side surfaces 502, 503 of the suspension base 500, there are formed concave cut-off portions 511, 512, 513, 514 whose longitudinal directions are parallel with the passing directions of the suspensions 550. The cut-off portions 511, 512, 513, 514 are formed such that predetermined spacing is provided between the cut-off portions 511, 512, 513, 514 and the flat plates 560 arranged at the suspensions 550 which penetrate the suspension base 500 from the suspension channel facing surfaces 523 located at four corners thereof to be fixed thereto. The cut-off portions 511, 512, 513, 514 have their dimensions independently determined, and the difference of the dimensions varies pressure that the flat plates 560 receive from synthetic resin. Accordingly, optimal strain of the suspensions 550 can be obtained by adjusting the dimensions of the cut-off portions 511, 512, 513, 514 and varying the pressure.

The rear surface 506 of the suspension base 500 is provided with the V-shaped cutout 509. The V-shaped cutout 509 is engaged with the M-shaped protrusion 301 formed on the actuator base 300, as described above, which positions the suspension base 500 on the actuator base 300.

The suspension base 500 is provided with two mounting holes 530 passing therethrough from the top surface 504 to the bottom surface 505. The actuator unit 400 is fixed to the actuator base 300 by sprung screws and fixing screws (not shown) which are inserted in the mounting holes 530.

The top surface 504 of the suspension base 500 is provided with a protrusion 507. The protrusion 507 corresponds to the gate position that injects synthetic resin at the time of insert molding of the suspension base 500.

{Configuration of Lens Holder}

Returning back to FIG. 1 and FIG. 2, the lens holder 600 is swingably linked to the suspension base 500 by means of the four suspensions 550. The lens holder 600 is substantially a hollow rectangular solid member made of synthetic resin, and is formed by insert molding, which injects synthetic resin into a mold with the flat plates 560 arranged at the suspensions 550 placed in the mold, at the same time as the suspension base 500. The lens holder 600 has a pair of holding arms 630 located at the ends thereof along the tracking direction T, and the suspensions 550 are fixed to the holding arms 630.

The lens holder 600 has a pair of coil substrates 610A, 610B attached to the side surfaces thereof, and has an objective lens 620 arranged substantially at the center of the top surface thereof.

A pair of magnets 340A, 340B are so fixed to the actuator base 300 as to face the coil substrates 610A, 610B attached to the lens holder 600, respectively.

The magnets 340A, 340B are so fixed as to face each other, and magnetic field is formed in space located therebetween in accordance with magnetized pattern brought about by the respective magnets 340A, 340B.

The lens holder 600, which has the coil substrates 610A, 610B attached to the side surfaces thereof, is arranged in magnetic field formed in space located between the pair of magnets 340A, 340B. Accordingly, when drive current of frequency within predetermined servo band (for example, 0 to 5 KHz) runs through a focusing coil and a tracking coil formed on the coil substrates 610A, 610B, the lens holder 600 having the objective lens 620 is made to move along the focusing direction F and the tracking direction T due to force brought about by the current running through the focusing and tracking coils and the magnetic field.

[Method of Molding Actuator Unit]

Figure 5:
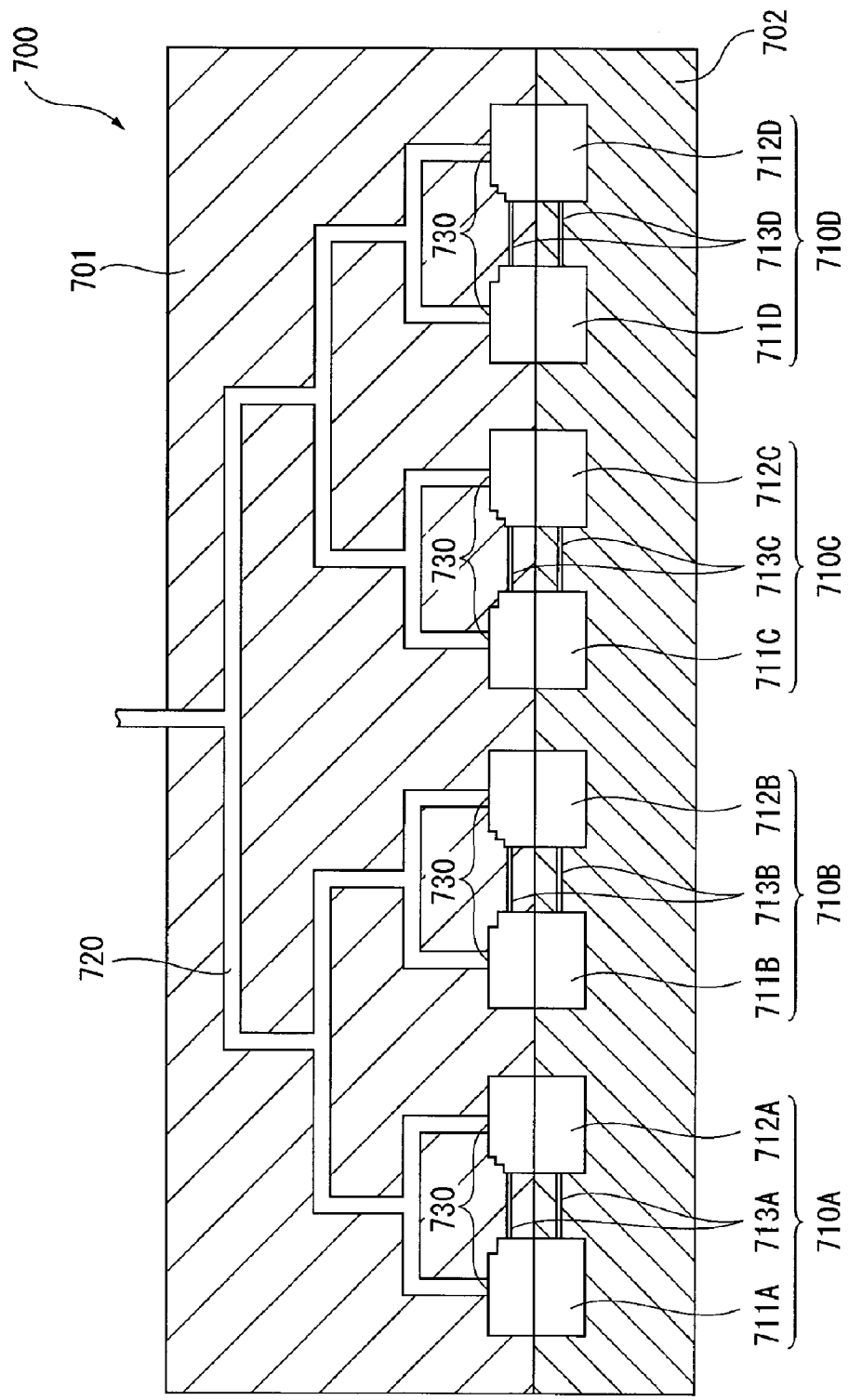
FIG. 5 shows a simplified cross-sectional view of a mold that is used to mold an actuator unit.
Figure 6A:
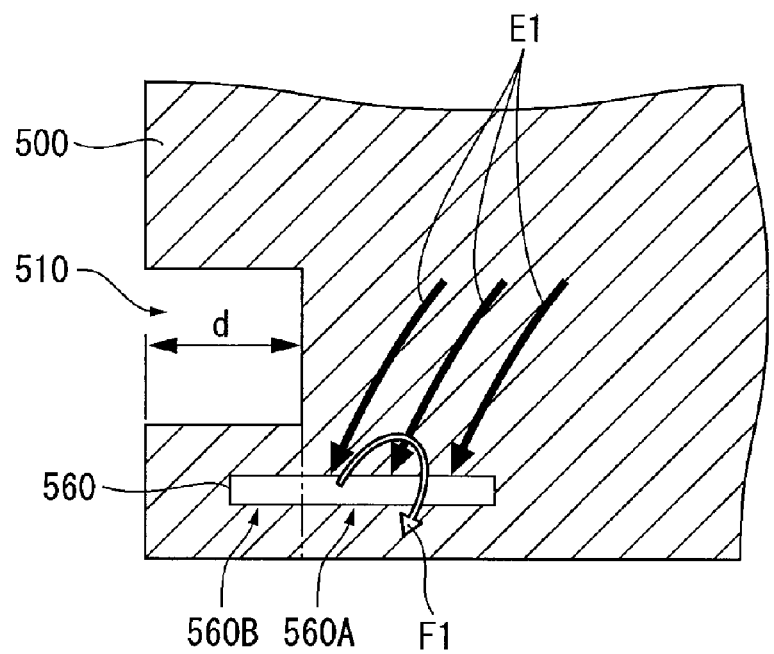
FIG. 6A shows a cross-sectional view of part of the suspension base to which a flat plate is fixed where a cut-off portion whose depth dimension is small is provided, in which pressure which the flat plate receives is indicated.
Figure 6B:
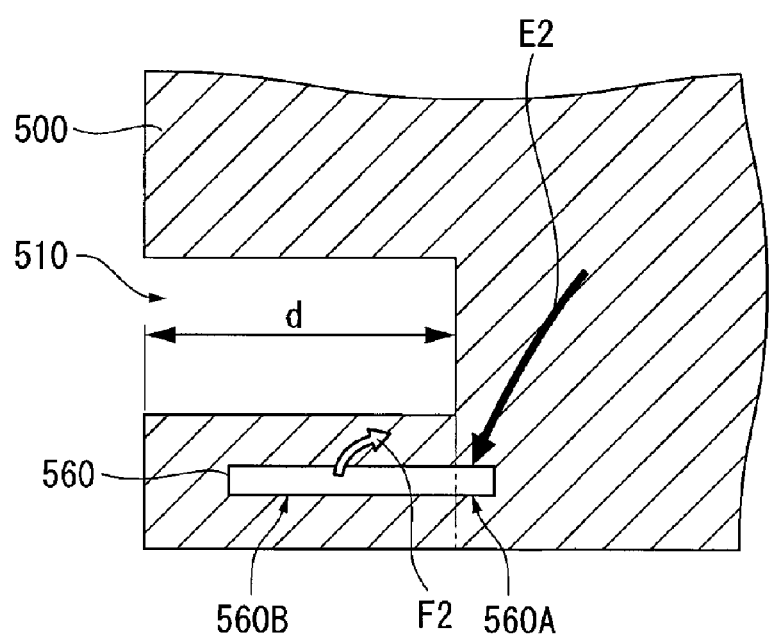
FIG. 6B shows a cross-sectional view of part of the suspension base to which a flat plate is fixed where a cut-off portion whose depth dimension is large is provided, in which pressure which the flat plate receives is indicated.

FIG. 5 shows a simplified cross-sectional view of a mold that is used to mold the actuator unit 400. FIG. 6A shows a cross-sectional view of part of the suspension base 500 to which the flat plate 560 is fixed where a cut-off portion 510 whose depth dimension is small is provided, in which pressure which the flat plate 560 receives is indicated. FIG. 6B shows a cross-sectional view of part of the suspension base 500 to which the flat plate 560 is fixed where a cut-off portion 510 whose depth dimension is large is provided, in which pressure which the flat plate 560 receives is indicated.

FIG. 5 shows a mold 700 that is used to mold the actuator units 400. The mold 700 has a plurality of cavities 710. In FIG. 5, four cavities 710A, 710B, 710C, 710D are indicated, while the number of cavities is not restricted to this and the mold 700 may have cavities more than four. The mold 700 has an upper mold 701 and a lower mold 702, and the upper mold 701 and the lower mold 702 jointly configure the cavities 710A, 710B, 710C, 710D.

The cavities 710A, 710B, 710C, 710D have suspension base cavities 711A, 711B, 711C, 711D which mold the suspension bases 500, and lens holder cavities 712A, 712B, 712C, 712D which mold the lens holders 600, respectively. Between the suspension base cavities 711A, 711B, 711C, 711D and the lens holder cavities 712A, 712B, 712C, 712D, there are formed suspension spaces 713A, 713B, 713C, 713D through which the suspensions 550 pass through. The suspension base cavities 711A, 711B, 711C, 711D and the lens holder cavities 712A, 712B, 712C, 712D of the upper mold 701 side are provided with gates 730 which are injection ports for injecting synthetic resin. The respective gates 730 are coupled to tubular lines 720, and molten synthetic resin is directed to the respective cavities 710A, 710B, 710C, 710D through the lines 720.

When molding the actuator units 400 using the mold 700, firstly, the flat plates 560 are placed in predetermined positions of the suspension base cavities 711A, 711B, 711C, 711D and the lens holder cavities 712A, 712B, 712C, 712D so as to place the suspensions 550 in the suspension spaces 713A, 713B, 713C, 713D. Then, fluidized synthetic resin is injected to the cavities 710A, 710B, 710C, 710D from the gates 730.

At this time, as shown in FIG. 6A and FIG. 6B, since synthetic resin is fluidized and parts the flat plates 560 placed at the cavities 710A, 710B, 710C, 710D are located at the cavity center side when viewed from the inner surfaces of the cut-off portions 510, the flat plates 560 are subject to pressure due to fluidized synthetic resin. As shown in FIG. 6A, in case a depth dimension "d" of the cut-off portion 510 is set to be small, area 560A of the flat plate 560 which is directly affected by fluidized synthetic resin becomes large. Accordingly, the flat plate 560 comes to be subject to a large pressure P1, which generates a large moment F1 and increases strain of the suspension 550.

On the other hand, as shown in FIG. 6B, in case a depth dimension "d" of the cut-off portion 510 is set to be large, area 560A of the flat plate 560 which is directly affected by fluidized synthetic resin becomes small, while area 560B of the flat plate 560 which is hardly affected by fluidized synthetic resin becomes large. Accordingly, the flat plate 560 comes to be subject to a comparatively small pressure P2, which generates a small moment F2 and reduces strain of the suspension 550.

Consequently, in the mold 700, when dimensions of parts of the cavities 710A, 710B, 710C, 710D, which form the cut-off portions 510, are varied stepwise, strain of the suspensions 550 can be adjusted, which can adjust the relative angle of the lens holder 600 against the suspension base 500. At respective junction parts of the suspension base 500 and the flat plates 560 arranged at the suspensions 550, the flowage state of synthetic resin is varied depending on the position of the gate 730 and affection by temperature change of synthetic resin. Thus, at the respective junction parts, depth dimensions "d" of the cut-off portions 510 are independently varied stepwise, thereby obtaining depth dimensions "d" which can minimize the relative angle of the lens holder 600 against the suspension base 500. Generally, mold components corresponding to the cut-off portions 510 in the vicinity of the respective junction parts are divided in advance so as to improve maintenance property of a mold. Especially, providing a mold with a single complicated cut-off portion as one three-dimensional part requires a high cost. On the other hand, finely adjusting dimensions of originally divided mold components and obtaining desired depth dimensions "d" of the cut-off portions is not a troublesome work.

Figure 7A:
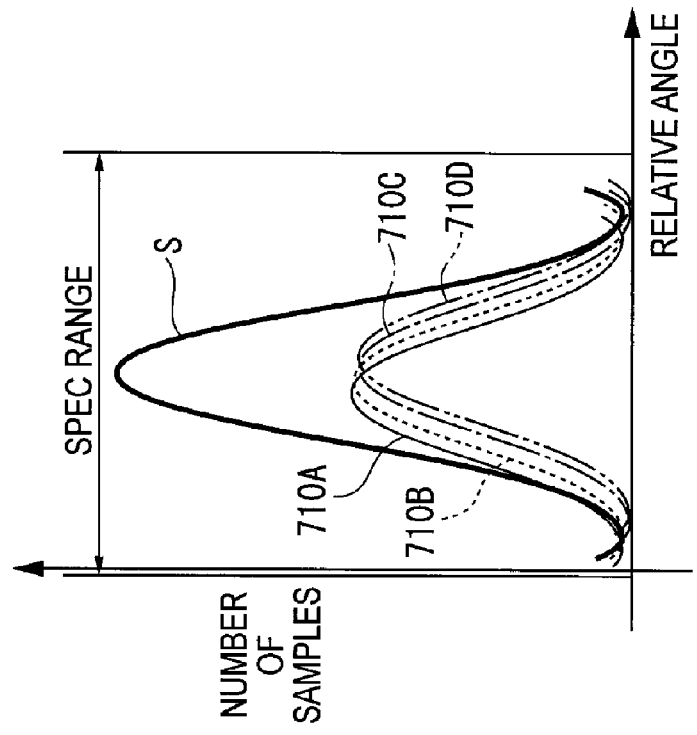
FIG. 7A shows a distribution chart indicative of the relation of relative angles of lens holders against the suspension bases of the actuator units molded by respective cavities, and the number of samples of the actuator units having the relative angles, when depth dimensions of the cut-off portions are not varied.

FIG. 7A shows a distribution chart indicative of the relation of relative angles of the lens holders 600 against the suspension bases 500 of the actuator units 400 molded by the respective cavities 710A, 710B, 710C, 710D, and the number of samples of the actuator units 400 having the relative angles, when depth dimensions "d" of the cut-off portions 510 are not varied, as is the conventional case. Of curved lines in the distribution chart, the full line indicates actuator units 400 molded by the cavity 710A, the dashed line indicates actuator units 400 molded by the cavity 710B, the chain line indicates actuator units 400 molded by the cavity 710C, the chain double-dashed line indicates actuator units 400 molded by the cavity 710D, while the heavy full line S indicates the entire fluctuation obtained by summing up these samples. As shown, in case depth dimensions "d" of the cut-off portion 510 are not set up, in the actuator units 400, the relative angles of the lens holders 600 against the suspension bases 500 come to vary significantly depending on the respective cavities 710A, 710B, 710C, 710D. As a result, the quality of the actuator units 400 cannot be uniformed, and limited ones among the actuator units 400 alone can be used as products.

Figure 7B:
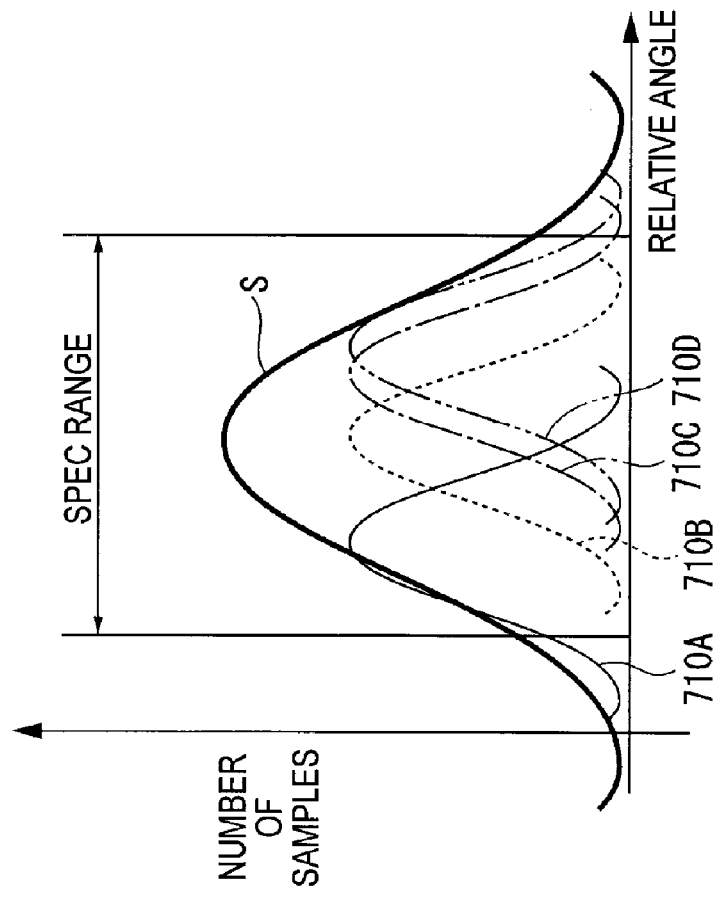
FIG. 7B shows a distribution chart indicative of the relation of relative angles of lens holders against the suspension bases of the actuator units molded by respective cavities, and the number of samples of the actuator units having the relative angles, when depth dimensions of the cut-off portions are varied stepwise.

On the other hand, FIG. 7B shows a distribution chart indicative of the relation of relative angles of the lens holders 600 against the suspension bases 500 of the actuator units 400 molded by the respective cavities 710A, 710B, 710C, 710D, and the number of samples of the actuator units 400 having the relative angles, when depth dimensions "d" of the cut-off portions 510 are varied stepwise so as to adjust the relative angles of the lens holders 600 against the suspension bases 500. In this case, in the actuator units 400 molded by the respective cavities 710A, 710B, 710C, 710D, the relative angles of the lens holders 600 against the suspension bases 500 come to be substantially uniformed. As a result, all the actuator units 400 molded by the respective cavities 710A, 710B, 710C, 710D can be used as products.

That is, according to the method of molding the actuator unit 400 of the first embodiment, at the respective cavities 710A, 710B, 710C, 710D of the mold 700, depth dimensions "d" of the respective cut-off portions 510 are varied stepwise to independently obtain desired depth dimensions "d" of the cut-off portions 510. Accordingly, actuator units 400 which have the optimal relative angle of the lens holder 600 against the suspension base 500 can be molded.

Advantages of the First Embodiment

According to the actuator unit 400 of the first embodiment, which is formed by insert molding under which synthetic resin is injected from the gates 730 with suspensions 550 placed at the suspension base cavities 711A, 711B, 711C, 711D for molding the suspension bases 500 and the lens holder cavities 712A, 712B, 712C, 712D for molding the lens holders 600, areas of the junction parts of the suspension bases 500 and the flat plates 560 which are directly affected by fluidized synthetic resin when the synthetic resin is injected are varied independently so as to correct strain of the suspensions 550.

Depth dimensions "d" of the cut-off portions 510 which are formed on the side surfaces 502, 503 of the suspension base 500 are adjusted, areas of the junction parts of the suspension bases 500 and the flat plates 560 which are directly pressed by fluidized synthetic resin are varied.

Thus, since the mold 700, which forms the suspension bases 500, has their parts for molding the cut-off portions 510 varied stepwise, areas of the respective junction parts which are directly affected by fluidized synthetic resin can be easily and precisely varied. Accordingly, strain of the suspensions 550 can be easily corrected at the respective junction parts, and relative angles of the lens holders 600 against the suspension bases 500 can be optimized.

Thus, strain of the suspensions 550 can be adjusted, and the relative angles of the lens holders 600 against the suspension bases 500 can be adjusted. Accordingly, when the relative angles of the lens holders 600 against the suspension bases 500 are made small, height dimensions of the actuator units 400 can be reduced, which can reduce skew adjustment range. As a result, a small-sized lightweight actuator unit of high-precision can be molded.

At this time, areas of the junction parts of the suspension bases 500 and the suspensions 550 which are directly pressed by fluidized synthetic resin are varied, thereby correcting strain of the suspensions 550. Thus, change of the relative skew against the suspension base 500 raised due to strokes of the lens holder 600 along the focusing direction and tracking direction is lowered. As a result, when recording and/or reproducing data to and/or from an optical recording medium of high density and high capacity such as a Blue-ray disc, desirable optical performance can be realized.

When the actuator unit 400 is molded, a plurality of the actuator units 400 are concurrently molded by the mold 700 having a plurality of the cavities 710 which can mold the plural actuator units 400. Consequently, a plurality of the actuator units 400 can be molded by a single mold 700, which easily enables mass production of the actuator unit 400.

Each of the cavities 710 corrects strain of the suspensions 550. Accordingly, a plurality of the actuator units 400 of substantially the same quality can be concurrently molded by the mold 700. As a result, all the actuator units 400 can be used as products.

Second Embodiment

Figure 9:
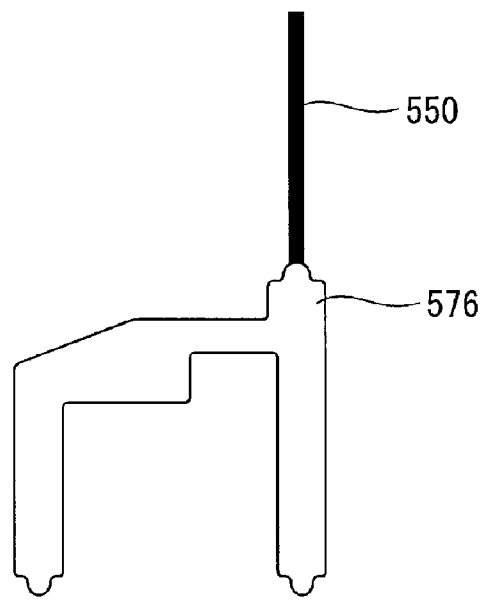
FIG. 9 shows a plan view of a variation of the shape employed for flat plates.
Figure 10:
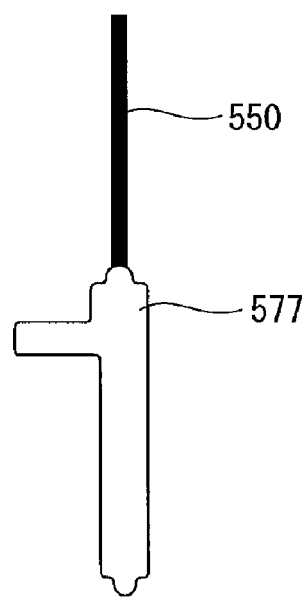
FIG. 10 shows a plan view of another variation of the shape employed for flat plates.
Figure 11:
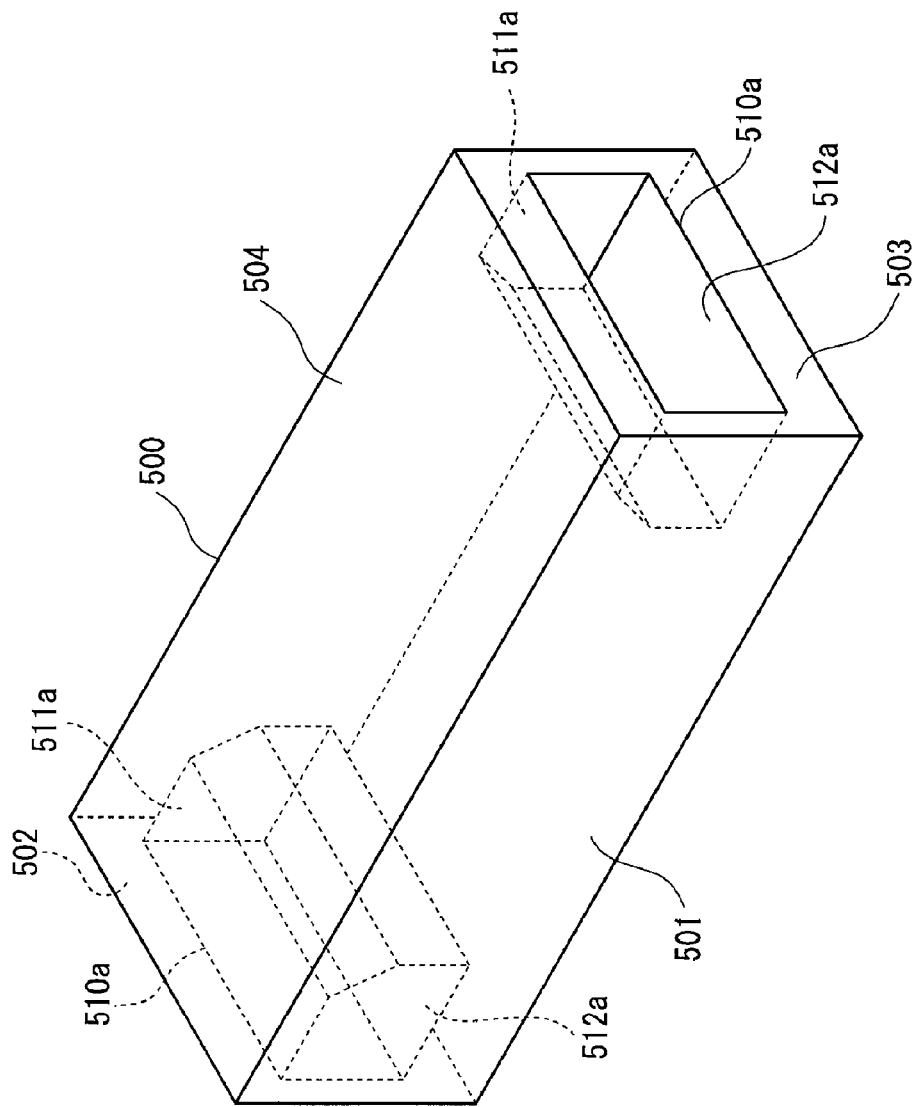
FIG. 11 shows a perspective view of a variation, in which the shape of a cut-off portion of the first embodiment is changed.

Next, the second embodiment will be described with reference to FIG. 8 to FIG. 10. In the second embodiment, parts or components similar to those of the first embodiment are indicated with the same reference numerals, and detailed explanation of which will be omitted.

[Configuration of Pick-Up Device]

A pick-up device 100 of the second embodiment includes a pick-up body 200, an actuator base 300 that is fixed to the pick-up body 200, an actuator unit 400 that is fixed to the actuator base 300, similar to the first embodiment. The actuator unit 400 includes a suspension base 500, a lens holder 600, and suspensions 550 that link the suspension base 500 and the lens holder 600.

{Configuration of Suspension Base}

Figure 8:
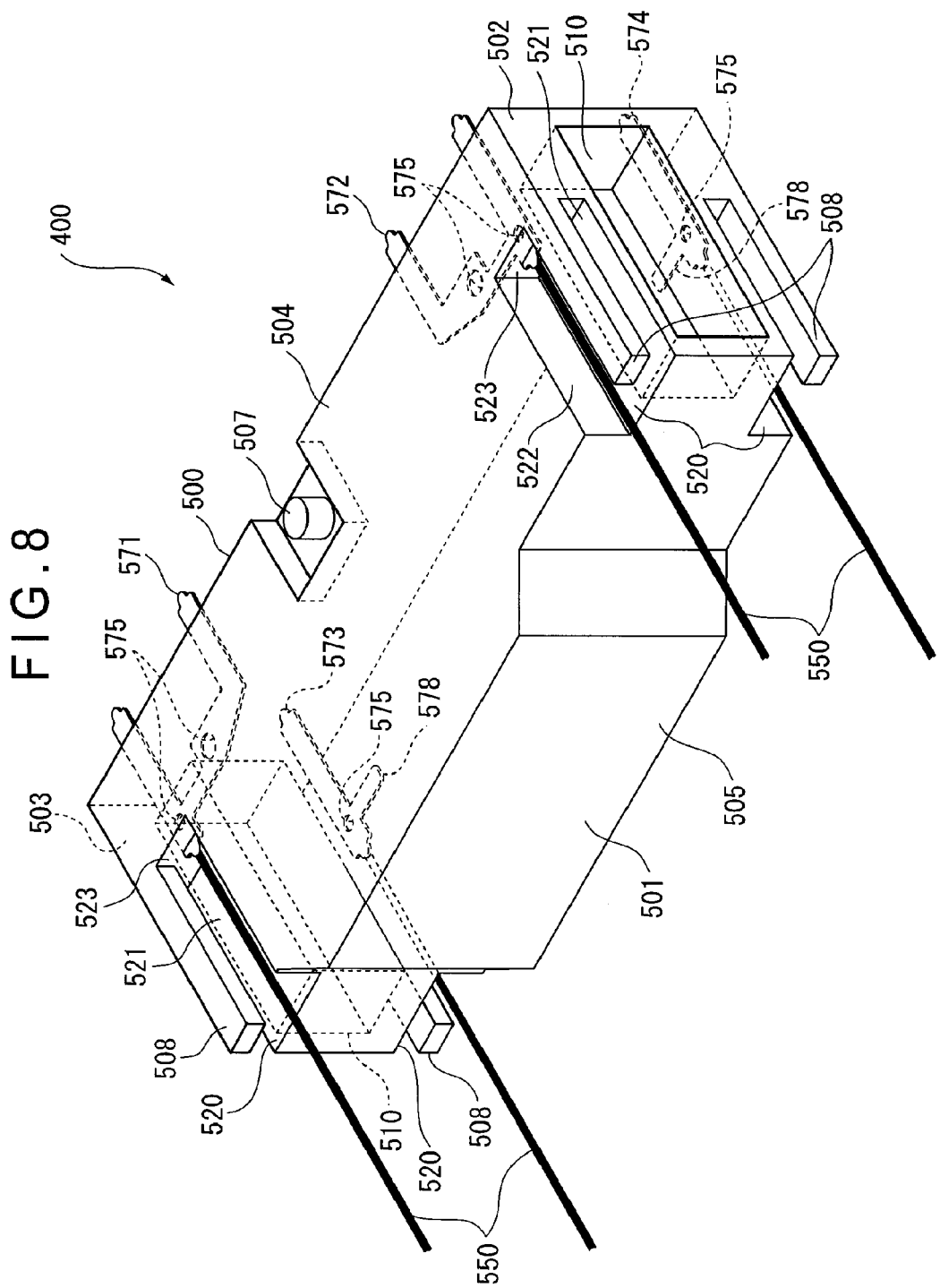
FIG. 8 shows a perspective view of a suspension base of the second embodiment viewed from a lens holder side.

FIG. 8 shows a perspective view of the suspension base 500 of the second embodiment viewed from the lens holder 600 side.

The suspension base 500 shown in FIG. 8 is formed by insert molding, which injects synthetic resin into a mold with flat plates 571, 572, 573, 574 arranged at the leading ends of the suspensions 550 placed in the mold. The suspension base 500 has a facing surface 501 that faces the lens holder 600, side surfaces 502, 503 adjoining the facing surface 501, a top surface 504 and a bottom surface 505 adjoining the facing surface 501 and the side surfaces 502, 503, and a rear surface 506 which is the opposite surface of the facing surface 501 and adjoins the side surfaces 502, 503 and the top surface 504 and the bottom surface 505. There are formed cut-off portions 510 on the side surfaces 502, 503 of the suspension base 500, and are formed suspension channels 520 along the passing directions of the suspensions 550.

The suspensions 550 link the suspension base 500 and the lens holder 600. The suspensions 550 have flat plates 571, 572, 573, 574 arranged at the leading ends thereof, which are to be inserted to the suspension base 500 and the lens holder 600.

These flat plates 571, 572, 573, 574 are formed into different shapes, which varies areas of junction parts of the suspension base 500 and the flat plates 571, 572, 573, 574. For example, the flat plates 571, 572 are formed substantially into U shapes with their substantial centers connected to the suspensions 550. The flat plates 571, 572 are provided with holes 575 substantially at the centers thereof, and the leading ends of the flat plates 571, 572 protrude from the rear surface 506 to be fixed to the suspension base 500. Areas of the junction parts of the suspension base 500 and thus configured flat plates 571, 572 are made large.

On the other hand, the flat plates 573, 574 are formed substantially into linear shapes with their one ends connected to the suspensions 550, and their other ends protruding from the rear surface 506 to be fixed to the suspension base 500. The flat plates 573, 574 are provided with holes 575 at one ends thereof, and have protrusions 578 that protrude toward the inside of the suspension base 500. Areas of the junction parts of the suspension base 500 and thus configured flat plates 573, 574 are made small.

The shapes of the flat plates 571, 572, 573, 574 are not restricted to those described above. FIG. 9 and FIG. 10 show variations of shapes which can be employed for the flat plates 571, 572, 573, 574. The flat plate 576 shown in FIG. 9 is a flat metal plate formed substantially into a flat U shape. The flat plate 576 is not provided with the holes 575. Thus, area of the junction part of the suspension base 500 and thus configured flat plates 576 is different from that of the case using the flat plates 571, 572 shown in FIG. 8. The flat plate 577 shown in FIG. 10 is a flat metal plate formed substantially into a flat linear shape, and is not provided with the holes 575. Thus, area of the junction part of the suspension base 500 and thus configured flat plates 577 is different from that of the case using the flat plates 573, 574 shown in FIG. 8. Furthermore, flat plates other than those shown in FIG. 8 to FIG. 10 can be used.

{Configuration of Lens Holder}

The lens holder 600 is swingably linked to the suspension base 500 by means of the four suspensions 550, similar to the first embodiment. The lens holder 600 has a pair of holding arms 630 located at the ends thereof along the tracking direction T, and the suspensions 550 are fixed to the holding arms 630.

The lens holder 600 has coil substrates 610A, 610B attached to the side surfaces thereof, and has an objective lens 620 arranged substantially at the center of the top surface thereof. Magnets 340A, 340B are so fixed to the actuator base 300 as to face these coil substrates 610A, 610B, respectively.

[Method of Molding Actuator Unit]

The actuator unit 400 of the second embodiment is formed by insert molding using the mold 700 shown in FIG. 5. When molding the actuator units 400, firstly, the flat plates 571, 572, 573, 574 are placed in predetermined positions of the suspension base cavities 711A, 711B, 711C, 711D and the lens holder cavities 712A, 712B, 712C, 712D so as to place the suspensions 550 in the suspension spaces 713A, 713B, 713C, 713D. Then, fluidized synthetic resin is directed to the lines 720, and is injected to the cavities 710A, 710B, 710C, 710D from the gates 730.

At this time, since the shapes of the flat plates 571, 572, 573, 574 are different, there is raised difference in size of area which is directly affected by fluidized synthetic resin. The flat plate whose flowage-affected area, which is directly affected by fluidized synthetic resin, is large is subject to a large pressure P due to the fluidized synthetic resin, which generates a large moment F and increases strain of the suspensions 550. On the other hand, the flat plate whose flowage-affected area, which is directly affected by fluidized synthetic resin, is small is subject to a small pressure P due to the fluidized synthetic resin, which generates a small moment F and reduces strain of the suspensions 550.

Consequently, when shapes of the flat plates 571, 572, 573, 574 are independently varied, strain of the suspensions 550 can be adjusted, which can adjust the relative angle of the lens holder 600 against the suspension base 500 of the actuator unit 400.

Advantages of the Second Embodiment

According to the method for molding the actuator unit 400 of the second embodiment, since shapes of the flat plates 571, 572, 573, 574 arranged at the leading ends of the suspensions 550 are varied, areas of the respective junction parts of the flat plates 571, 572, 573, 574 and the suspension base 500 which are directly affected by fluidized synthetic resin are varied.

Thus, it is not necessary to vary parts of the mold 700 corresponding to the cut-off portions 510 stepwise, as is different from the method for molding the actuator unit 400 of the first embodiment, and strain of the suspensions 550 can be corrected by only changing shapes of the flat plates 571, 572, 573, 574.

Variations of the Embodiments

The present invention is not limited to the above-described embodiments, but various modifications, alternative constructions or equivalents can be implemented without departing from the scope and spirit of the present invention.

Figure 12:
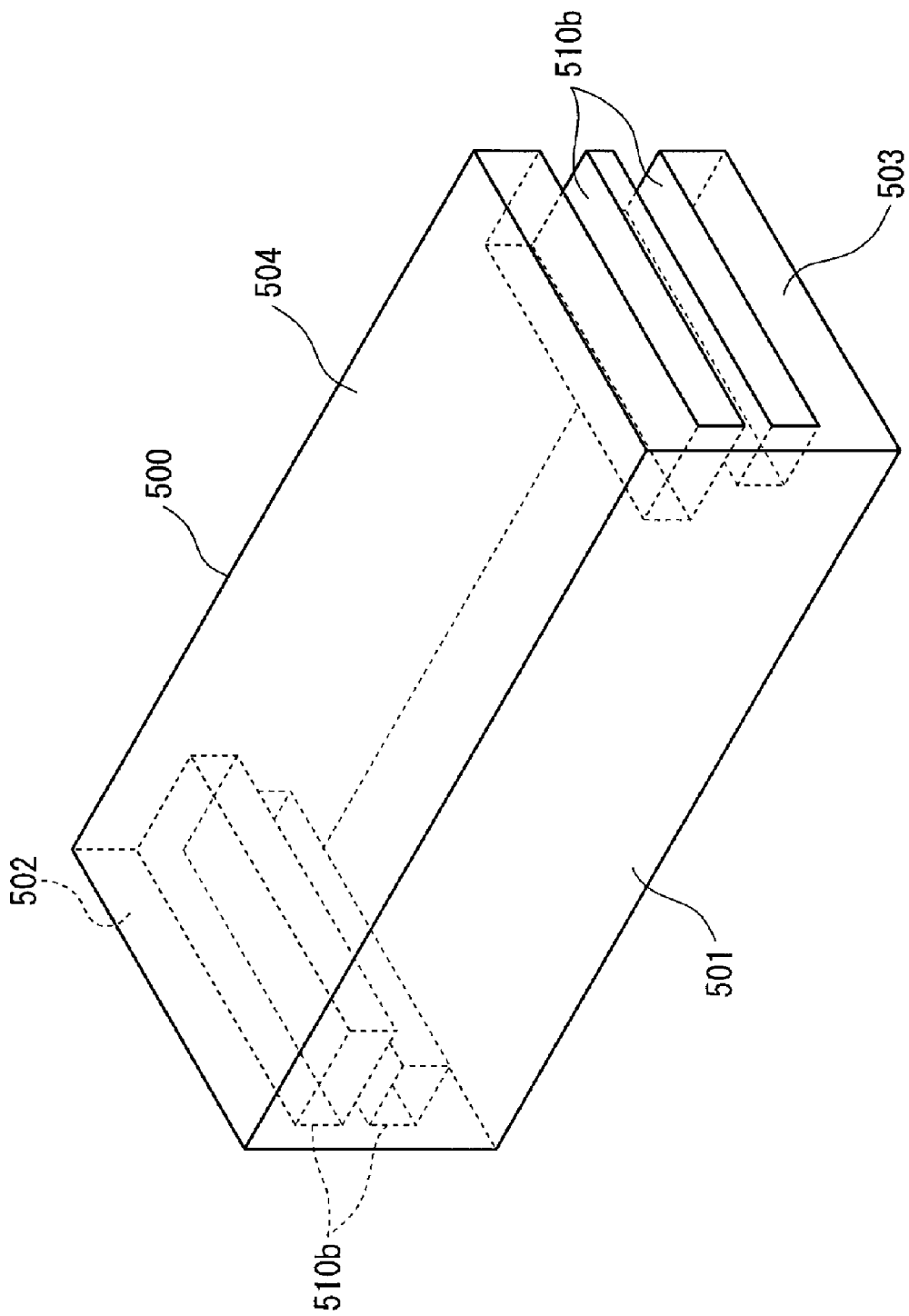
FIG. 12 shows a perspective view of another variation, in which the shape of a cut-off portion of the first embodiment is changed.
Figure 13:
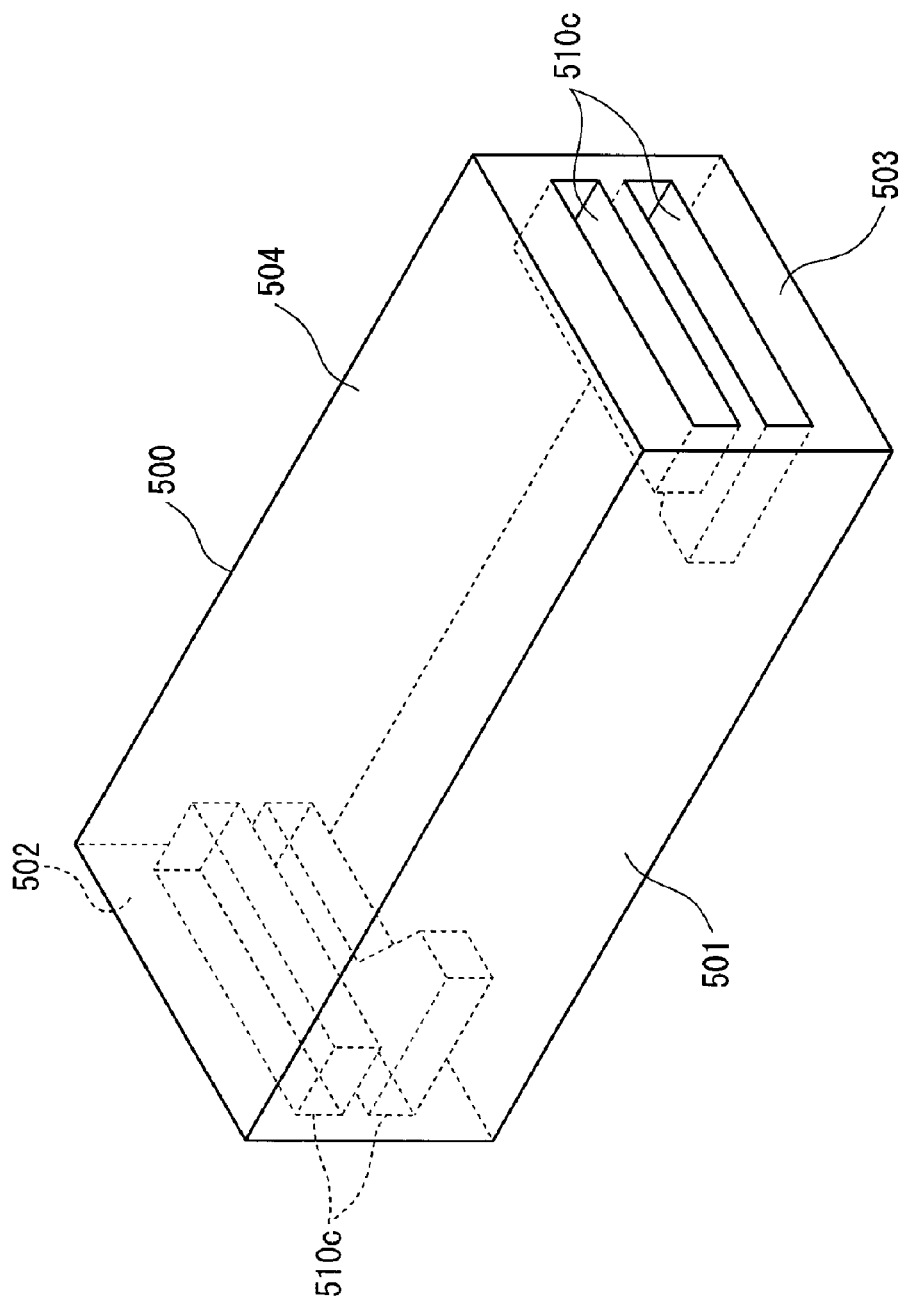
FIG. 13 shows a perspective view of another variation, in which the shape of a cut-off portion of the first embodiment is changed.
Figure 14:
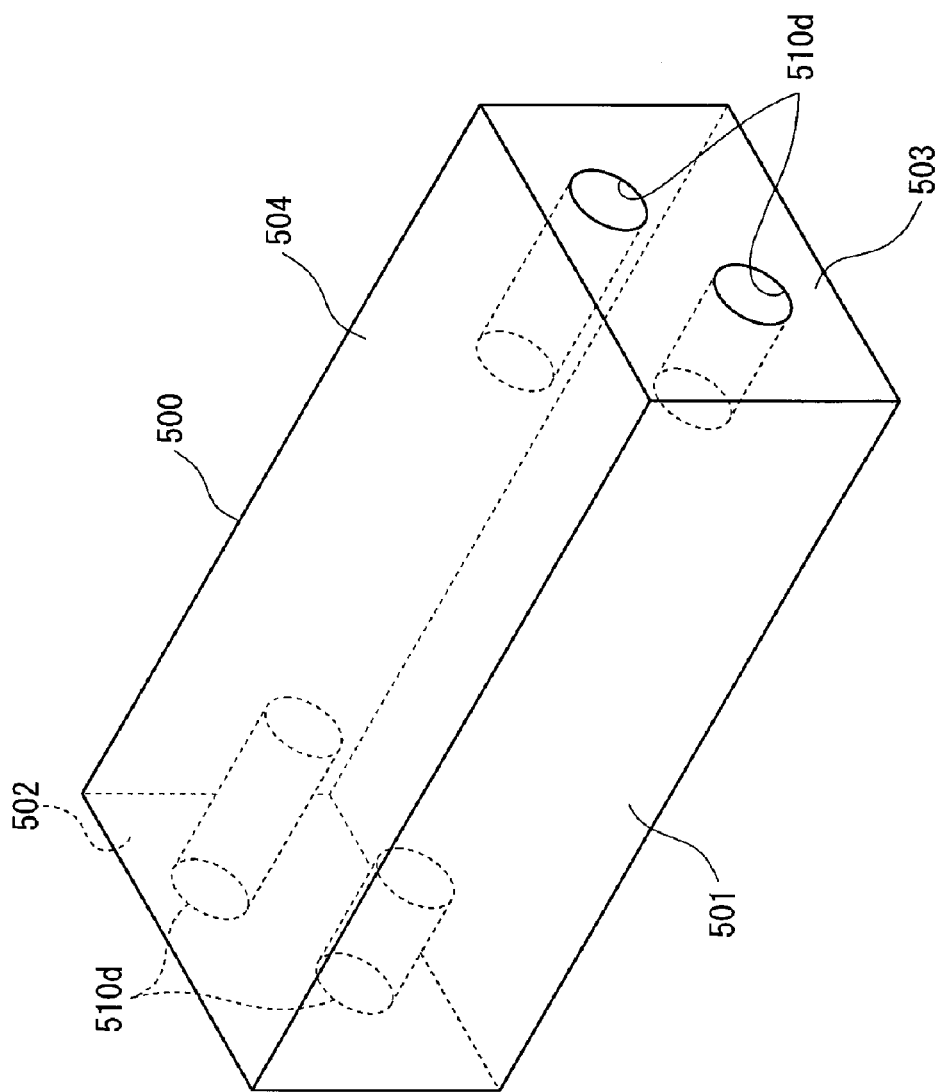
FIG. 14 shows a perspective view of another variation, in which the shape of a cut-off portion of the first embodiment is changed.

In the first embodiment, for example, in the vicinity of the junction parts of the suspension base 500 and the flat plates 560 located on the side surfaces 502, 503, the cut-off portions 510 whose longitudinal directions are parallel with the passing directions of the suspensions 550 are formed, to which the embodiment is not restricted. For example, a single cut-off portion 510a may be formed between a couple of flat plates 560 which are fixed to the suspension base 500 on the top surface 504 side and on the bottom surface 505, as shown in FIG. 1. In this case, the depth dimension of the cut-off portion 510a on the top surface 504 side and that on the bottom surface 505 side can be changed stepwise. Furthermore, cut-off portions 510b may be formed in the suspension base 500 on the side surfaces 502, 503 sides as well as on the rear surface 506 side, as shown in FIG. 12. Furthermore, cut-off portions 510c whose depth dimension on the facing surface 501 side and that on the rear surface 506 side are different may be formed, as shown in FIG. 13, and cut-off portions 510d in the shape of a cylinder may be formed, as shown in FIG. 14.

Figure 15:
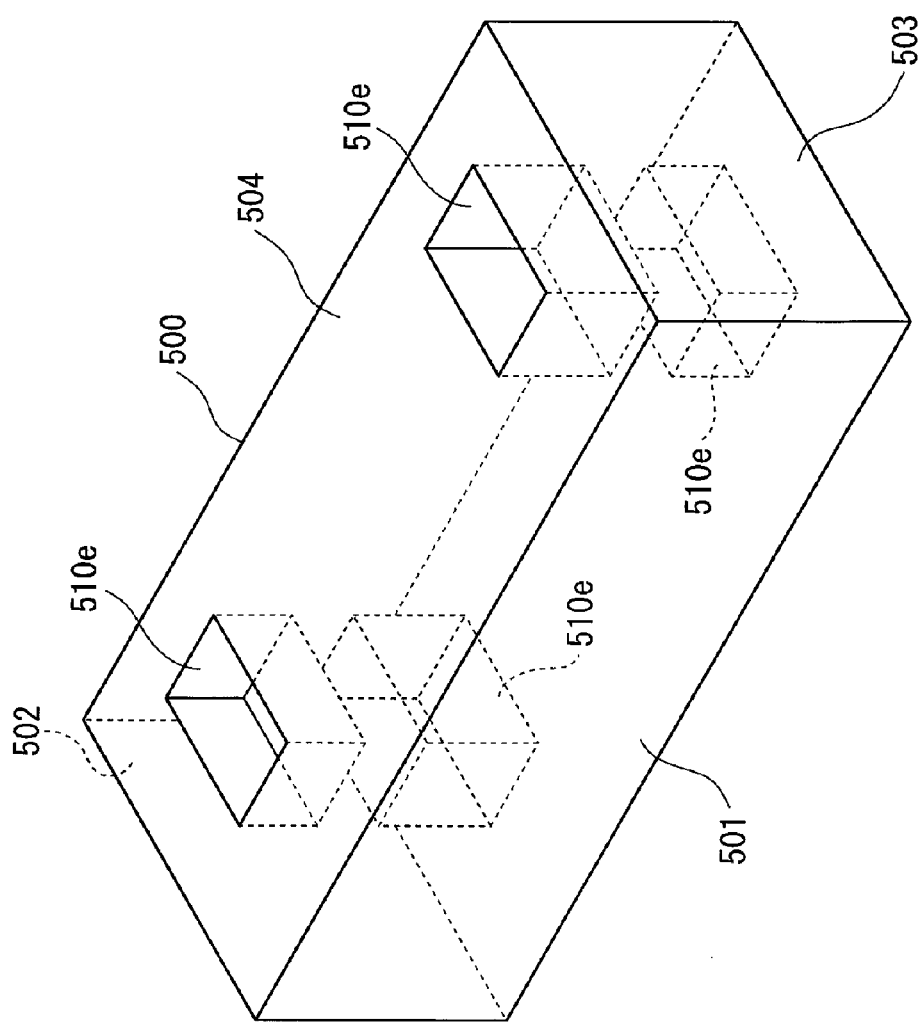
FIG. 15 shows a perspective view of another variation, in which the shape of a cut-off portion of the first embodiment is changed.
Figure 16:
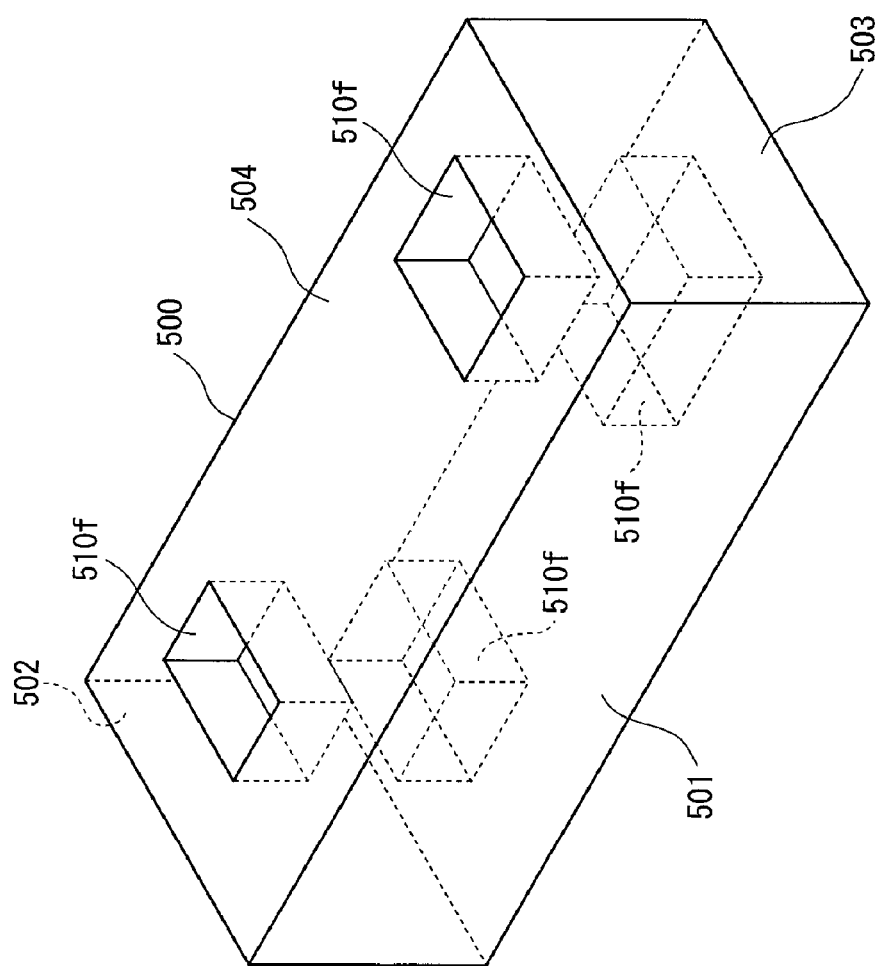
FIG. 16 shows a perspective view of another variation, in which the shape of a cut-off portion of the first embodiment is changed.
Figure 17:
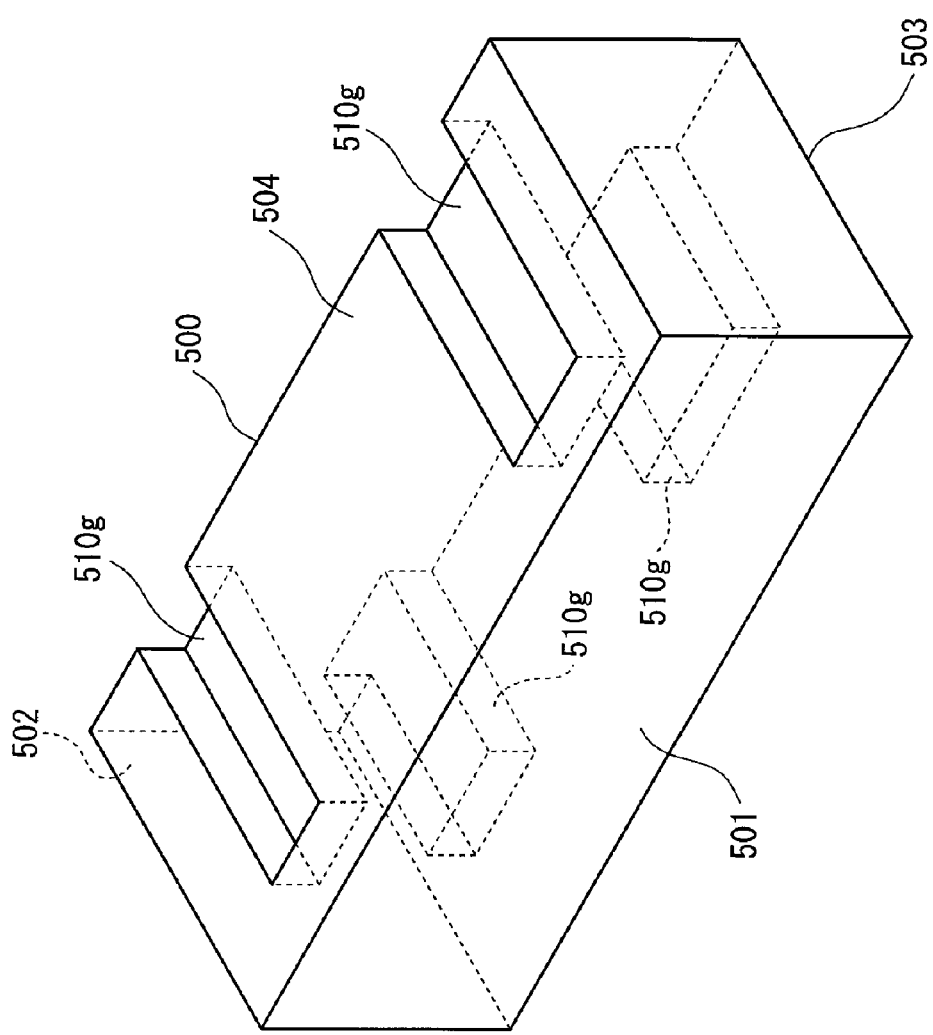
FIG. 17 shows a perspective view of another variation, in which the shape of a cut-off portion of the first embodiment is changed.
Figure 18:
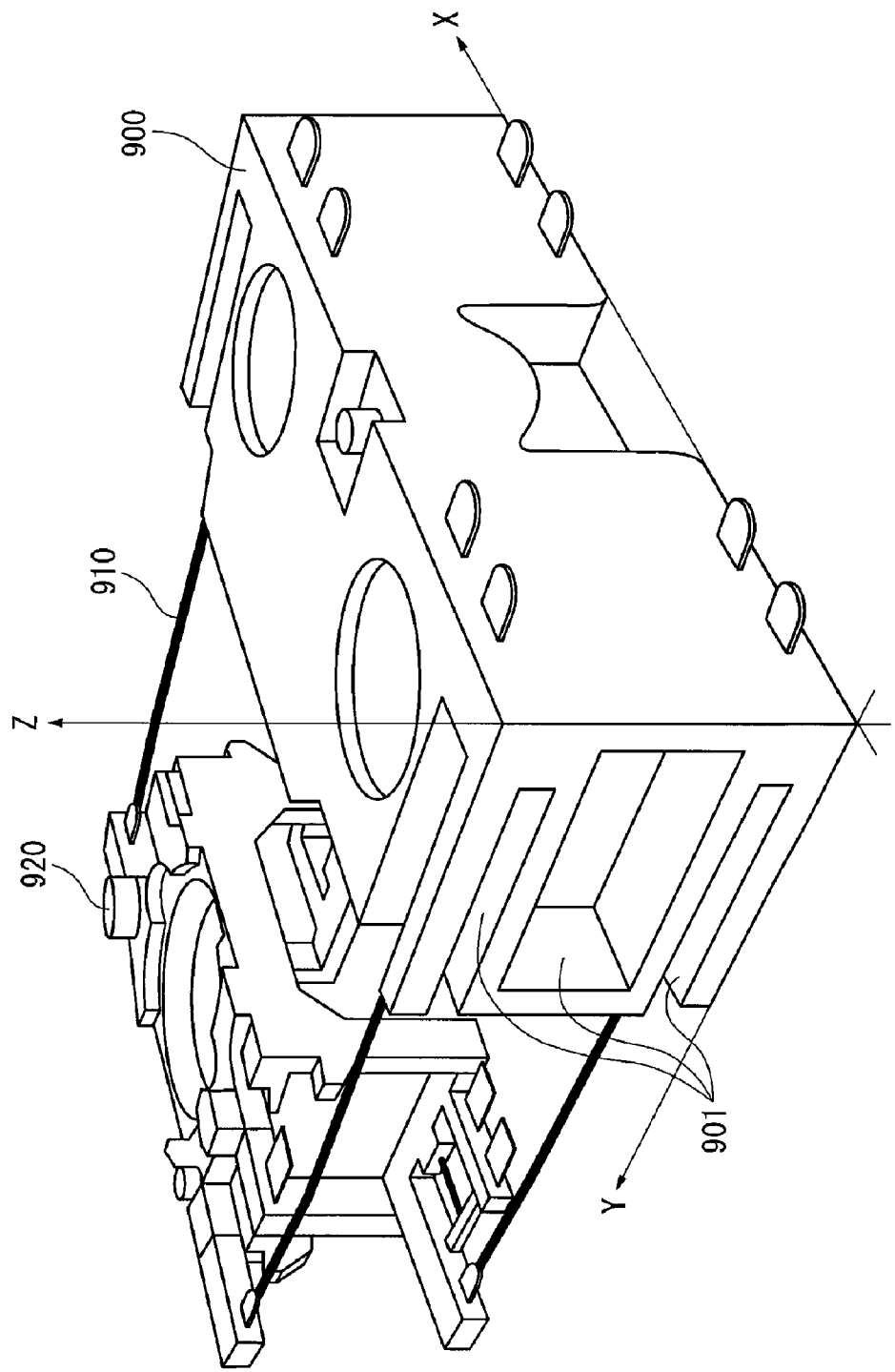
FIG. 18 shows a perspective view of a conventional actuator unit.

Furthermore, cut-off portions 510e may be formed on the top surface 504 and on the bottom surface 505 of the suspension base 500, which can independently adjust areas of the flat plates 560 which are directly affected by fluidized synthetic resin by changing the depth dimension thereof from the top surface 504 and from the bottom surface 505, as shown in FIG. 15. Furthermore, cut-off portions 510f may be formed on the top surface 504 and on the bottom surface 505 of the suspension base 500, whose dimensions along surface directions on the top surface 504 and on the bottom surface 505 and shapes are varied without varying the depth dimension thereof from the top surface 504 and from the bottom surface 505, as shown in FIG. 16. Furthermore, cut-off portions 510g may be formed on the top surface 504 and the bottom surface 505 side as well as on the rear surface 506 side, as shown in FIG. 17.

As in the above, shapes and setting positions of the cut-off portions 510 can be varied in many ways, and other types of cut-off portions 510 can be realized other than those of the above-described variations. Since depth dimensions, shapes and setting positions of the cut-off portions 510 are changed stepwise, at the time of insert molding of the actuator unit 400, areas of the flat plates 560 which are directly affected by fluidized synthetic resin can be independently adjusted.

In the first and second embodiments, areas of the junction parts of the suspension base 500 and the flat plates 560 arranged at the suspensions 550 which are directly affected by fluidized synthetic resin are changed, to which the embodiments are not restricted. That is, parts which are directly affected by fluidized synthetic resin and whose areas have to be changed may be junction parts of the lens holder 600 and the flat plates 560 arranged at the suspensions 550, or both of the junction parts of the suspension base 500 and the flat plates 560 arranged at the suspensions 550 and the junction parts of the lens holder 600 and the flat plates 560 arranged at the suspensions 550. In case both of the junction parts of the suspension base 500 and the flat plates 560 and the junction parts of the lens holder 600 and the flat plates 560 are changed, the suspension base 500, the suspensions 550, and the lens holder 600 can be adjusted more appropriately, which can adjust the relative angle of the lens holder 600 against the suspension base 500 more accurately.

Furthermore, in the first and second embodiments, the mold 700 that molds the actuator units 400 has four cavities 710A, 710B, 710C, 710D, to which the embodiments are not restricted. As described above, the number of cavities arranged in the mold 700 is not restricted, and the mold 700 may have cavities more than four, or may have a single cavity. The mold 700 which has a plurality of cavities can mold the plural actuator units 400 concurrently, the number of which corresponds to the number of the cavities, which can realize mass production. The mold 700 which has a single cavity can set depth dimensions "d" of the cut-off portions 510 and shapes of the flat plates 571, 572, 573, 574 easily.

Moreover, in the first and second embodiments, a method for molding the actuator unit 400 is explained, to which the embodiments are not restricted. That is, by employing the method for molding a synthetic resin structure, a lead frame can be formed by insert molding using an IC package made of synthetic resin, or a small-sized mechanical switch having plural circuit contact points which is required to be controlled precisely can be formed.

Advantages of the Embodiments

According to the embodiments, at the time of insert molding under which synthetic resin is injected from the gates 730 with suspensions 550 placed at the suspension base cavities 711A, 711B, 711C, 711D for molding the suspension bases 500 and the lens holder cavities 712A, 712B, 712C, 712D for molding the lens holders 600, areas of the junction parts of the suspension bases 500 and the flat plates 560 which are directly affected by fluidized synthetic resin when the synthetic resin is injected are varied independently so as to correct strain of the suspensions 550.

Thus, strain of the suspensions 550 can be adjusted, and the relative angles of the lens holders 600 against the suspension bases 500 can be adjusted. Accordingly, when the relative angles of the lens holders 600 against the suspension bases 500 are made small, height dimensions of the actuator units 400 can be reduced, which can reduce skew adjustment range. Thus, change of the relative angles raised due to strokes of the actuator unit 400 can be minimized. As a result, a small-sized lightweight actuator unit of high-precision can be molded.

The priority application Number JP 2004-041752 upon which this patent application is based is hereby incorporated by reference.

What is claimed is:

1. A method of insert molding a device comprising a first synthetic resin structure, a second synthetic resin structure, and a plurality of metal elastic holding members which link the first synthetic resin structure and the second synthetic resin structure, the device being formed by injecting, from injection ports, synthetic resin into a mold with the elastic holding members placed in the mold, wherein the at least one of the first synthetic resin structure and the second synthetic resin structure includes at least one concave cut-off portion, to prevent shrinkage, located in a vicinity of a junction area between one of the elastic holding members and the first or the second synthetic resin structures;

the method comprising:

adjusting a size of the concave cut-off portion to correct a strain of the respective one of the elastic holding members which is directly pressed by fluidized synthetic resin during the injecting; and injecting the synthetic resin to mold the device.

2. The method according to claim 1, wherein the first synthetic resin structure is a moving structure that holds an objective lens, and the second synthetic resin structure is a fixed structure that swingably holds the moving structure through the plural elastic holding members.

3. The method according to claim 1, comprising varying the junction areas which are directly pressed by fluidized synthetic resin by changing the shape of ends of at least one of the respective elastic holding members.

4. The method according to claim 1, comprising insert molding a plurality of the device, and wherein the mold has a plurality of cavities for molding plural devices, synthetic and plural synthetic resin structures are concurrently molded by injecting the synthetic resin into the plurality of cavities.

5. The method according to claim 1, comprising independently adjusting respective sizes of the concave cut-off portions.

6. The method according to claim 4, comprising independently adjusting respective sizes of the concave cut-off portion.

7. The method according to claim 1, wherein the metal elastic holding member and the junction area are outside of the concave cutoff portion.

8. The method according to claim 1, wherein longitudinal directions of the concave cut-off portion are parallel with a passing direction of the metal elastic holding member in the vicinity thereof.

* * * * *